US007433590B2

United States Patent
Freyman

(10) Patent No.: US 7,433,590 B2
(45) Date of Patent: Oct. 7, 2008

(54) METHOD OF LOW INTENSITY LIGHTING FOR HIGH SPEED IMAGE CAPTURE

(75) Inventor: Christopher Alan Freyman, Macungie, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 267 days.

(21) Appl. No.: 11/217,961

(22) Filed: Sep. 1, 2005

(65) Prior Publication Data

US 2006/0232825 A1  Oct. 19, 2006

Related U.S. Application Data

(60) Provisional application No. 60/672,780, filed on Apr. 19, 2005.

(51) Int. Cl.
  *G03B 15/03* (2006.01)
  *G06K 7/10* (2006.01)
  *G06K 9/00* (2006.01)
  *H04N 7/18* (2006.01)

(52) U.S. Cl. .................. 396/157; 396/171; 235/454; 382/143; 348/132

(58) Field of Classification Search .......... 396/57, 396/59, 157, 257, 171; 356/218, 237.5; 354/441, 446, 266, 415, 423; 250/559.04, 250/559.08, 559.39; 348/86–95, 125–134, 348/164–168; 382/141, 149, 194, 224, 143; 235/454

See application file for complete search history.

(56) References Cited

U.S. PATENT DOCUMENTS

| | | | |
|---|---|---|---|
| 3,962,601 A | 6/1976 | Wrzesinski | |
| 3,967,111 A | 6/1976 | Brown | |
| 4,816,855 A * | 3/1989 | Kitaura et al. | ........... 396/57 |
| 4,839,734 A | 6/1989 | Takemura | |
| 4,860,096 A | 8/1989 | Long et al. | |
| 5,010,412 A | 4/1991 | Garriss | |
| 5,353,122 A | 10/1994 | Kim | ........... 358/296 |
| 5,354,977 A | 10/1994 | Roustaei | |
| 5,640,464 A * | 6/1997 | Ebel et al. | ........... 382/143 |
| 5,745,176 A | 4/1998 | Lebens | |
| 6,069,659 A | 5/2000 | Nakajima | |
| 6,091,452 A | 7/2000 | Nishiyama | |
| 6,238,060 B1 | 5/2001 | Bourn et al. | |
| 6,256,067 B1 | 7/2001 | Yamada | |
| 6,271,884 B1 | 8/2001 | Chung et al. | |
| 6,438,272 B1 | 8/2002 | Huang et al. | |

(Continued)

FOREIGN PATENT DOCUMENTS

JP    5328210    10/1993

(Continued)

*Primary Examiner*—Melissa Jan Koval
(74) *Attorney, Agent, or Firm*—Nelson Mullins Riley & Scarborough, L.L.P.

(57) ABSTRACT

A system for synchronizing image capture and a light source has a first strobing light emitting diode (LED) array with a plurality of LEDs located to light an illumination area. The LED array has an on cycle during which the LED array is activated and an off cycle during which the LED array is inactivated. The system also has a camera located with a view of the illumination area. The camera has an image exposure that coincides with the on cycle of the strobing LED array.

16 Claims, 3 Drawing Sheets

U.S. PATENT DOCUMENTS

| | | | |
|---|---|---|---|
| 6,483,935 B1 * | 11/2002 | Rostami et al. | 382/141 |
| 6,488,390 B1 | 12/2002 | Lebens et al. | |
| 6,697,154 B2 * | 2/2004 | Owen et al. | 356/237.5 |
| 6,885,393 B2 * | 4/2005 | Herre | 348/125 |
| 2002/0191102 A1 * | 12/2002 | Yuyama et al. | 348/370 |
| 2004/0056608 A1 | 3/2004 | Dietz et al. | |

FOREIGN PATENT DOCUMENTS

| | | |
|---|---|---|
| JP | 6334817 | 2/1994 |
| JP | 2001/215579 | 10/2001 |

* cited by examiner

METHOD OF LOW INTENSITY LIGHTING FOR HIGH SPEED IMAGE CAPTURE

CROSS REFERENCE TO RELATED APPLICATION(S)

This application claims the benefit of U.S. Provisional Patent Application No. 60/672,780 filed on Apr. 19, 2005 which is incorporated by reference as if fully set forth.

BACKGROUND

The present invention relates to an illumination system for use with machine vision systems, such as optical and barcode scanning systems. More particularly, it relates to a system for strobing a light source in sync with a camera shutter or other machine vision system; such that the camera shutter is open or the machine vision system is activated when the light source is on.

There are various lighting technologies used in traditional machine vision systems. While the choice of lighting largely depends on the type of image enhancement required (i.e diffusion, feature enhancement, profile), high speed image capture requires sufficient light energy for use with very short exposure times. Depending on image exposure requirements, different light sources can be used, each having its advantages and disadvantages.

For a long exposure time, such as greater than 1 ms, a system might use fluorescent or LED lighting. Such systems are advantageous because they consume less power and dissipate heat efficiently. The disadvantage of such systems are that low light output limits use to long exposures, and therefore slow speed imaging. Further, they are vulnerable to ambient light, and requires either shielding to limit external light or an optical filter to pass only monochromatic light.

For a shorter exposure time, such as that less than 1 ms, but not using a strobed light source, a system might use halogen, high pressure sodium, or metal halide lighting. The advantages for of such lighting systems are the high light output that is useful in high speed imaging. The disadvantages are low efficiency because the system consume a lot of power and dissipate heat. Further, the bright light source can be an annoyance to nearby personnel, and light shields are sometimes required to limit exposure to personnel.

For a shorter exposure time, such as that less than 1 ms, using a strobed light source, a system might use LEDs (which can be strobed at many times rated DC current value, yielding much higher light output; see applicant's examples below) or Xenon lighting. The advantages of such lighting systems are the high light output for use in high speed imaging combined with high efficiency because of low power consumption and heat dissipation. The disadvantage is that the strobing source can be annoying to nearby personnel. Frequencies of 7 HZ-15 HZ are particularly dangerous since they have been shown to trigger epileptic seizures. Further, light shields are sometimes required to limit exposure to personnel.

In order to increase accuracy and maintain consistency in the data collected by machine vision systems, it is important to have an efficient direct source of light to fully illuminate the area being scanned (hereinafter the "illumination area"). The invention seeks to solve this problem and overcome the problems of the prior art.

SUMMARY

A system for synchronizing image capture and a light source has a first strobing light emitting diode (LED) array with a plurality of LEDs located to light an illumination area. The LED array has an on cycle during which the LED array is activated and an off cycle during which the LED array is inactivated. The system also has a camera located with a view of the illumination area. The camera has an image exposure that coincides with the on cycle of the strobing LED array.

The inventive lighting is suited for use with AUTO-ID equipment, which read coded symbology on packages, OCR (optical character recognition), OCV (optical character verification), and/or any other type of AUTO-ID type application. As discussed herein, the focus is reading coded symbology, but this in no way limits the field of the application from OCR, OCV, or other AUTO-ID applications.

BRIEF DESCRIPTION OF THE DRAWING(S)

The foregoing summary, as well as the following detailed description of the invention, will be better understood when read in conjunction with the appended drawings. For the purpose of illustrating the invention, presently preferred embodiments are shown in the drawings. It should be understood, however, that the invention is not limited to the precise arrangements and instrumentalities shown. In the drawings.

DETAILED DESCRIPTION OF THE PREFERRED EMBODIMENT(S)

Figure 1:
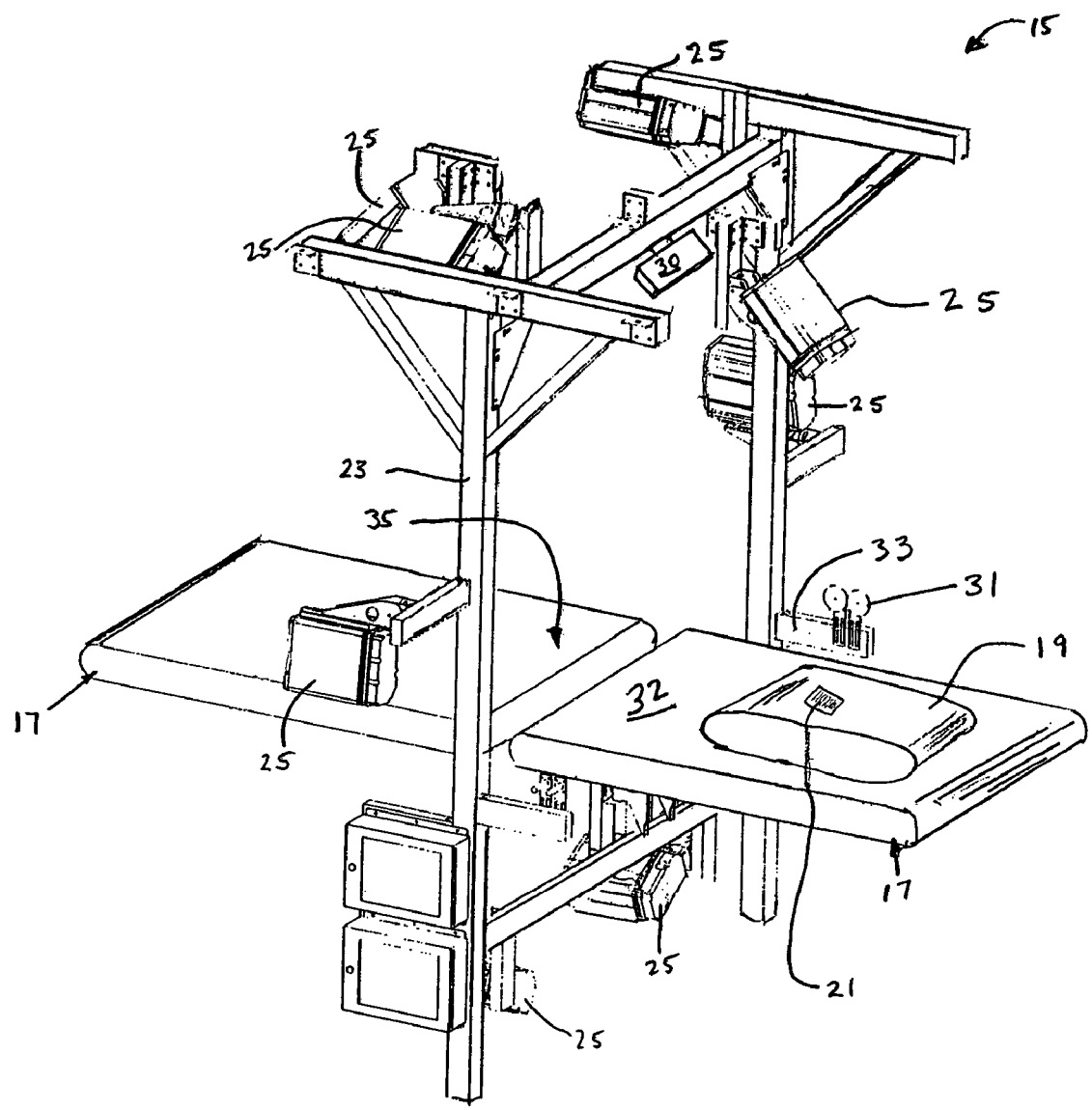
FIG. 1 is a perspective view of a system using the invention.

A scanning system 15 is shown in FIG. 1. The scanning system 15 is positioned along a conveyor section 17 that carries objects or packages 19. The scanning system 15 includes one or more cameras (or vision systems) 25 mounted either above the object 19 to be scanned or positioned to any side to capture coded symbologies 21 (shown on a tag) located on the object 19. Although several cameras 25 are shown, some applications would only need one. The scanning system 15 includes a stand 23 that preferably extends above, below, and to the sides of a conveyor section 17 conveying an object 19.

The cameras 25 in FIG. 1 are mounted such that they generally have a field of view that captures the coded symbology 21 to be scanned.

A light source 30 illuminates an illumination area 32 on the conveyor 17. This illumination area 32 corresponds the camera lens's view, and thus light emitted from the light source 30 illuminates the illumination area 32 so that the camera 25 can take an adequately lit picture of the illumination area 32, and any object 19 thereon.

The light source 30 is a strobing light that strobes at a frequency such that the light pulses are not visible to the eye, or more accurately, the brain averages out the pulses of light such that the light appears to be always on. The minimum strobing frequency where a human stops seeing a light source as a flickering source, is about 60 Hz, so long as the source is kept at a fixed frequency.

There are several advantages of such a strobing light source 30. First, the strobing source consumes much less power than the high pressure sodium or metal halide light sources. The Applicant has found that when a light source of LEDs is driven at fifteen times its DC operating current, the power consumption in the light source between a continuous on and strobing light source drops from 1.22 A to 366 mA. This is because the duty cycle of the light source 30 is about 1% of its corresponding "always on" state. (See Example discussed below.) Second, the "continuously on" light sources get hot, and in practice, the applicant has used an auxiliary fan to cool these light sources. The strobing light source does not get as hot. Third, the LEDs illuminate the illumination area 32 so well that bright light sources like a 50 W halogen bulb do not cause any washout, even when placed in close proximity to the illumination area 32.

An LED's optical response is typically 10-100 ns. LED thermal response is typically >1 ms. At pulses widths greater than 1 ms, the peak LED junction temperature is greater than the average junction temperature. Beyond 1 ms, derating must be used since the peak junction temperature is higher than the average junction temperature.

Due to this fact, LEDS can be pulse driven at many times their DC rated current as long as:
  1. The pulse width of LED "on" time is less than 1 ms
  2. The average thermal dissipation is at or below rated DC max.

LED optical output is fairly linear with respect to operating current.

Having discussed the advantages of the strobing light source, it also has its limitations. When used to illuminate the illumination area 32 that the camera 25 would capture a picture of, the camera 25 does not average the light source like the human brain, and the strobing light can affect a picture adversely. An example of this problem of strobing light sources can be seen when a camera shoots a picture of a television screen (which strobes) at a high shutter speed. The picture captured often shows a portion of the television screen of the screen as blank because the strobed light for that portion of the television screen has not been illuminated.

To overcome this problem, the camera 25 must expose its image sensor (preferably a CCD sensor) at the same time that the LED is strobing so that the CCD sensor captures the illuminated area 32, and not the area when it is dark. For some digital cameras, this is doubly complicated because there are two types of shutters: a rolling shutter and a frame or global shutter. In a rolling shutter, only a portion of the CCD imager is exposed during a time period, and in a global shutter, the entire CCD imager is exposed at once. Since the light source is strobing, and timing is important to the present invention, the global shutter camera is preferred, as it exposes the entire CCD imager at once, at a time coincident with a strobe of light.

Figure 2:
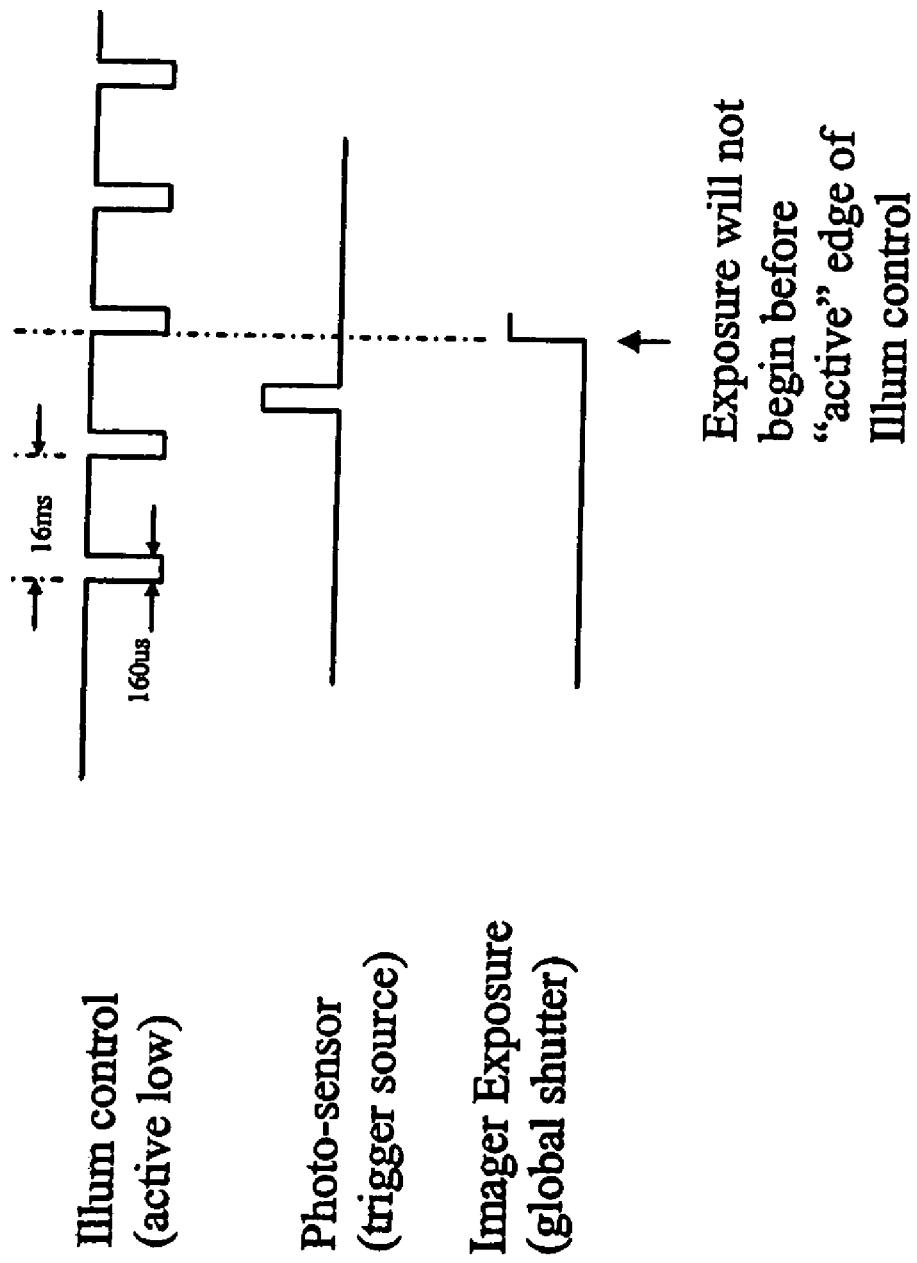
FIG. 2 is a time diagram of the strobing light source, image exposure, and trigger.

FIG. 2 shows how the invention compensates for the criticality of the timing of image exposure and light strobe. The timing diagram shows the light pulses along the illumination control line, and that the image exposure coincides with an the activated edge of the pulse. Thus the image exposure is exposed during the light pulse, so it will capture light reflected from the illumination area 32. For cameras not capable of 60 Hz shutter speed, as long as the exposure is synchronized with the light pulses, the CCD sensor will capture adequate light for recording an image. That is, for such cameras, the shutter could be synchronized to expose the CCD sensor at every xth pulse, where x is any integer.

The camera/lighting system can be free-running (camera constantly taking pictures) or externally triggered. In a triggered system, the trigger would be activated such that the camera 25 exposes the image sensor during a period of strobed light. Such trigger timing is shown in FIG. 2. The trigger could be manual or an automatic trigger that is activated when a beam of light 33 is broken (as shown in FIG. 1). Alternatively, the trigger could be activated upon the occurrence of an event, such as blocking the camera photo-sensor.

Figure 4:
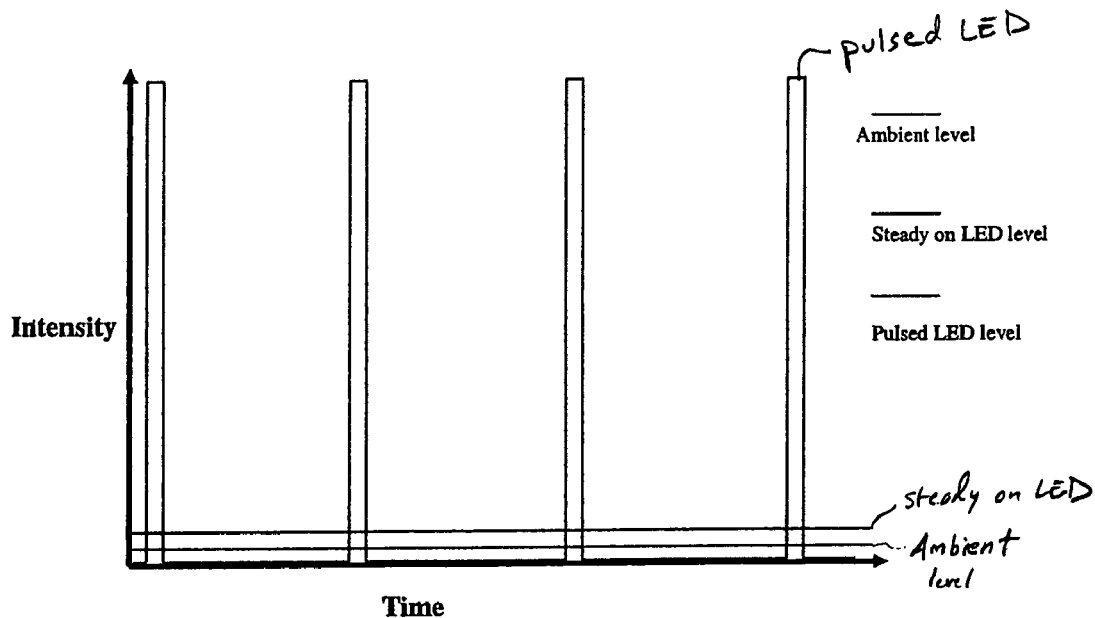
FIG. 4 is a graph showing time versus light intensity.

Without any external shielding, the illumination area 32 is typically subject to ambient light. With bright illumination sources such as high pressure sodium and metal haylide, the ambient levels are inconsequential and do not result in over exposure of the image. However, LED illuminations run in steady state are typically only 2 to 3 times that of ambient and resulting exposures can be significantly influenced by changes in ambient levels. Since the pulsed LEDs run at 15× their steady state counterparts, they are 30-50 times brighter than ambient light, and thus, ambient light does not overexpose images and external light shielding is not required. (See graph in FIG. 4.)

Even in slower speed applications, the invention still has an advantage since the 15× light output affords the ability to stop down the lens aperture, increasing the camera's depth of field. This is an advantage in hand inducted decoding since the distance of the object to be scanned reference the camera can vary greatly. It allows the operator greater freedom with the object to be scanned and improves throughput.

Operation

Figure 3:
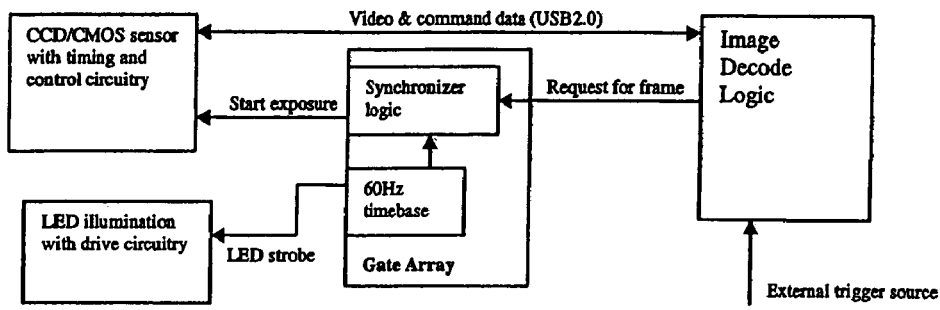
FIG. 3 is a flowchart/functional diagram showing the operation of the invention.

As seen in FIG. 3, the system comprises a camera head and separate decoder unit. The camera head contains the CCD or CMOS sensor board, timing and control circuitry, gate array (FPGA or ASIC) which supports the LED strobe and camera exposure, and the LED illumination board. The decoder unit is an embedded PC running custom barcode decode algorithms. In the preferred embodiment, the data and command link between the decoder and camera is USB 2.0.

The process starts with either an external trigger request (object to be decoded blocks photo-sensor) or internal by decoder (self-trigger, after it is done processing that data from the camera's previous frame). Once triggered, the decoder sends a request for video frame to the camera via the USB link. The synchronizer logic receives the request and waits to synchronize the camera exposure to the next available LED strobe pulse. Once exposure is complete, the camera immediately sends the video frame to the decoder for processing. Upon completion of decode, the decoder will either request another frame for processing (self trigger) or wait for the next external trigger event. While waiting, the LED strobe continues to run uninterrupted.

EXAMPLE WITH APPLICANT'S DESIGN

The applicant has found, as mentioned briefly above, that certain conditions are advantageous in using the invention. These are discussed below.

Continuous DC Max

LED vf=1.81V

LED If=0.04A 1.81V×0.04A=72.4 mW

Using 176 LEDs give 12.74 Watts total power dissipation

Pulsed at 15× Max DC Current using 1% Duty Cycle (180 us)@ 60 Hz

LED vf=3.62 (LED vf doubles for 15× increase in operating current due to exponential IV characteristics)

LED If=0.6A 3.62×0.6A=2.172 W

Since the device is running with a 1% duty cycle, average power dissipation is 2.172×0.01=21.72 mW Using 176 LEDS gives 3.822 Watts total power dissipation This represents one-third the power dissipation for 15 times the light output. Also, since the human eye averages these pulses, the brightness level appears only one third that of the "continuous on" version.

In the applicant's design, the 12.74 W dissipation required a cooling fan on the enclosure, while reduction to 3.8 W eliminated the need for a fan.

In another embodiment, not shown, the light source 30 could be used in conjunction with a laser scanner that scans the symbology, and cameras that are mounted to capture pictures when an item is not successfully scanned.

While the preferred embodiments of the invention have been described in detail, this invention is not limited to the specific embodiments as described above, which should be considered as merely exemplary. Further modifications and extensions of the present invention may be developed based upon the foregoing, and all such modifications are deemed to be within the scope of the present invention as defined by the appended claims.

What is claimed is:

1. A system for synchronizing image capture and a light source comprising:
   a. a first strobing light emitting diode (LED) array comprising a plurality of LEDs located above a conveyor belt and configured to light an illumination area on the conveyor belt, the LED array having
      i. an on cycle during which the LED array is activated; and
      ii. an off cycle during which the LED array is inactivated,
      wherein the strobing LED array is strobed at a fixed frequency to provide apparently constant human observable illumination of the illumination area during operation of the conveyor belt; and
   b. a camera located with a view of the illumination area, the camera having an image exposure that coincides with the on cycle of the strobing LED array.

2. The system of claim 1, wherein the frequency of the on cycle is at least 60 Hz.

3. The system of claim 1, wherein the camera comprises a CCD sensor.

4. The system of claim 1, wherein the camera comprises a global shutter.

5. The system of claim 1, wherein the camera comprises a global shutter and CCD sensor.

6. The system of claim 1, wherein a camera image exposure request occurs prior to the coincidence of the image exposure and the on cycle of the strobing LED array.

7. The system of claim 6, wherein the camera image exposure request is initiated by a trigger.

8. The system of claim 6, wherein the camera image exposure request is initiated by the decoder.

9. The system of claim 1, wherein the camera comprises a global shutter CMOS imager.

10. A system for synchronizing an image capture and a light source for use in a barcode scanning tunnel comprising:
    a. a scanning tunnel frame;
    b. a conveyor belt for moving objects through the scanning tunnel frame;
    c. a first strobing light array mounted on the scanning tunnel frame and positioned to illuminate an area of the conveyor belt, the strobing light array having
       i. an on cycle during which the light array is activated, and
       ii. an off cycle during which the light array is inactivated,
       wherein the strobing light array is strobed at a fixed frequency to provide an apparently constant human observable illumination intensity on the illuminated conveyor belt area during operation of the conveyor belt; and
    d. a camera located with a view of the illuminated conveyor belt area, the camera having an image exposure that coincides with the on cycle of the strobing light array.

11. The system of claim 10, wherein the frequency of the on cycle is at least 60 Hz.

12. The scanning system of claim 10, further comprising a trigger, wherein said trigger is an optically activated trigger that is activated by the presence of the object on the conveyor at a certain position.

13. The system of claim 10, wherein the strobing light source comprises at least one light emitting diode.

14. The system of claim 10, wherein the camera image exposure is initiated prior to the on cycle of the strobing light source.

15. The system of claim 14, wherein the camera image exposure is initiated by a trigger.

16. The system of claim 15, wherein the trigger is an optical sensor.

* * * * *